United States Patent
Efrati et al.

(10) Patent No.: US 10,992,610 B2
(45) Date of Patent: Apr. 27, 2021

(54) SYSTEMS AND METHODS FOR AUTOMATING POST COMMUNICATIONS ACTIVITY

(71) Applicant: Vonage Business Inc., Atlanta, GA (US)

(72) Inventors: Tzahi Efrati, Hoboken, NJ (US); Antonio Hung, IV, Garnerville, NY (US); Deepak Ottur, Hillsborough, NJ (US); Michael Gruosso, Roslyn Heights, NY (US)

(73) Assignee: Vonage Business, Inc., Atlanta, GA (US)

( * ) Notice: Subject to any disclaimer, the term of this patent is extended or adjusted under 35 U.S.C. 154(b) by 488 days.

(21) Appl. No.: 15/608,213

(22) Filed: May 30, 2017

(65) Prior Publication Data
US 2018/0351887 A1    Dec. 6, 2018

(51) Int. Cl.
| | | |
|---|---|---|
| G06F 15/16 | (2006.01) |
| H04L 12/58 | (2006.01) |
| G06Q 30/00 | (2012.01) |
| H04L 29/08 | (2006.01) |
| G06Q 30/02 | (2012.01) |
| H04L 29/06 | (2006.01) |
| G06Q 20/14 | (2012.01) |
| G06Q 10/06 | (2012.01) |
| G06Q 50/06 | (2012.01) |

(52) U.S. Cl.
CPC ...... *H04L 51/046* (2013.01); *G06Q 10/06311* (2013.01); *G06Q 20/145* (2013.01); *G06Q 30/016* (2013.01); *G06Q 30/0201* (2013.01); *G06Q 50/06* (2013.01); *H04L 67/1095* (2013.01); *H04L 67/42* (2013.01)

(58) Field of Classification Search
CPC .......... G06Q 30/016; G06Q 10/06311; G06Q 30/0201; G06Q 30/06; G06Q 30/0601; G06Q 30/0605; G06Q 30/0613; G06Q 30/0617; G06Q 30/0631; G06Q 30/0633; H04L 51/046; H04L 67/1095
See application file for complete search history.

(56) References Cited

U.S. PATENT DOCUMENTS

| | | | | |
|---|---|---|---|---|
| 6,668,281 | B1 * | 12/2003 | Ayyadurai | G06F 40/268 709/223 |
| 10,200,468 | B2 * | 2/2019 | Leban | H04L 67/1095 |
| 2003/0233419 | A1 * | 12/2003 | Beringer | G06Q 10/107 709/206 |
| 2004/0073503 | A1 * | 4/2004 | Morales | G06Q 40/00 705/35 |

(Continued)

*Primary Examiner* — Dustin Nguyen
*Assistant Examiner* — Hao H Nguyen
(74) *Attorney, Agent, or Firm* — FisherBroyles, LLP; Joseph Pagnotta

(57) ABSTRACT

Systems and methods for assisting a first participant to a synchronous communication in communicating with a second participant to the synchronous communication involves automatically obtaining metadata or other information relevant to the synchronous communication, and providing the metadata or other information to the first participant. In some instances, a draft communication from the first participant to the second participant may be generated based on the content of the synchronous communication, and that draft communication may be provided to the first participant.

19 Claims, 9 Drawing Sheets

(56) References Cited

U.S. PATENT DOCUMENTS

| | | | |
|---|---|---|---|
| 2007/0038711 A1* | 2/2007 | MacBeth | G06Q 10/107 709/206 |
| 2008/0167914 A1* | 7/2008 | Ikeda | G06Q 10/06311 705/7.13 |
| 2014/0082090 A1* | 3/2014 | Wodzinski | G06Q 10/109 709/205 |
| 2014/0126823 A1* | 5/2014 | St. Jacques | G06K 9/00442 382/187 |
| 2014/0282089 A1* | 9/2014 | West | H04L 65/403 715/753 |
| 2014/0297770 A1* | 10/2014 | Wada | H04L 51/02 709/206 |
| 2015/0195225 A1* | 7/2015 | Albert | H04L 51/063 709/206 |
| 2016/0335605 A1* | 11/2016 | Tessler | G06Q 10/1095 |
| 2018/0268345 A1* | 9/2018 | Tolica | G06Q 10/06311 |

\* cited by examiner

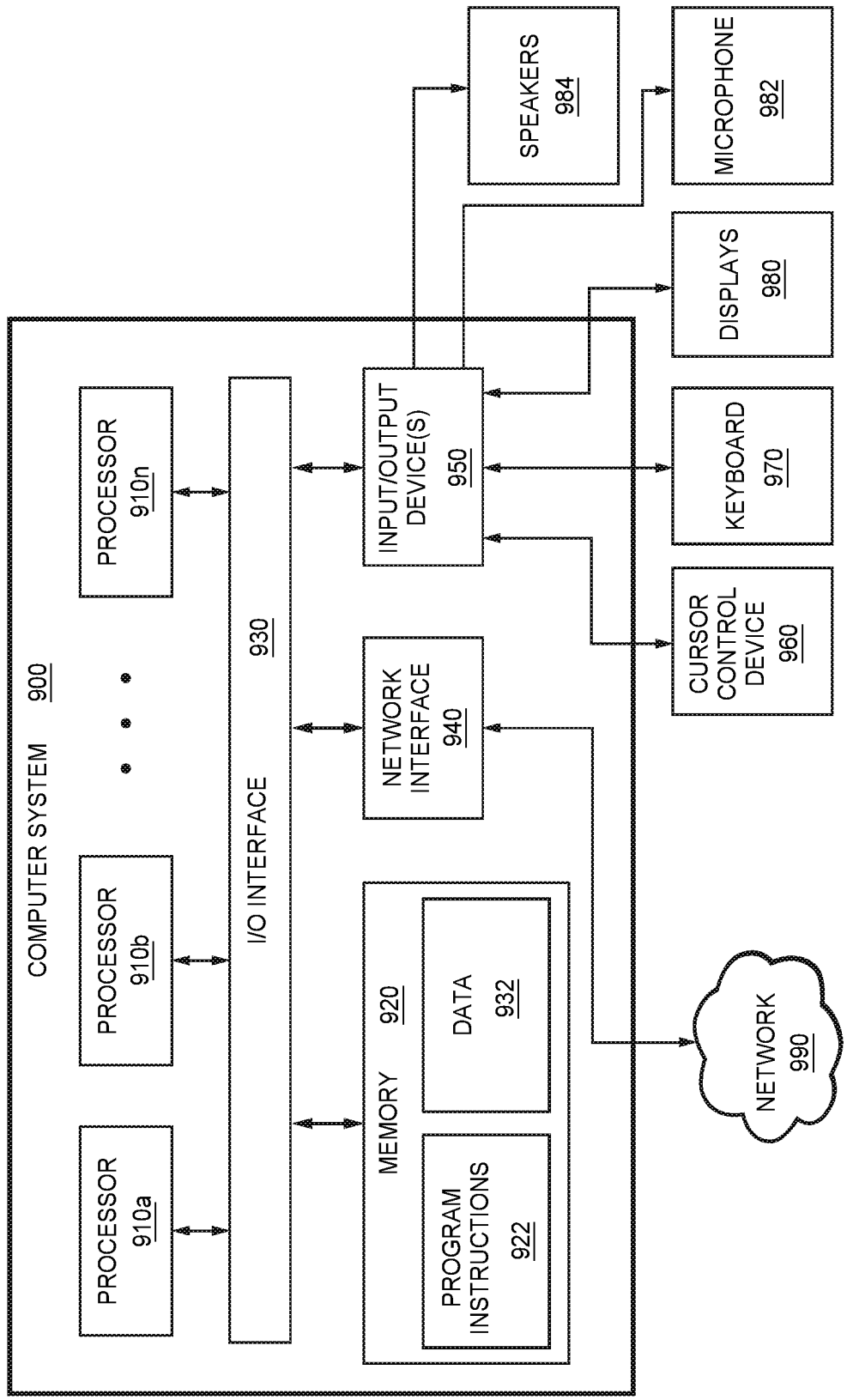

SYSTEMS AND METHODS FOR AUTOMATING POST COMMUNICATIONS ACTIVITY

BACKGROUND OF THE INVENTION

The invention is related to tools used by sales agents and customer service agents to facilitate interactions with clients.

Many sales agents routinely place telephone calls to present and potential clients. Likewise, sales agents frequently receive telephone calls from present and potential clients. During such phone calls, the sales agent may learn from the client the information the client is most interested in hearing before agreeing to a sale. In some instances, the client could request specific information. The sales agent could agree to forward such information to the client at a later date. In addition, the sales agent and the client could agree to another meeting or call to be conducted in the future, after the sales agent has forwarded such information to the client, and after the client has had an opportunity to review the information.

Typically, the sales agent will take notes during such a call so that after the call is completed, the sales agent will know what information to send to the client. Such notes may also indicate when the next agreed upon meeting or call is to occur. In some instances, the sales agent may record the call, and then later review the recording to determine what information the sales agent promised to send, or when the parties agreed to next meet or conduct a call.

After such a call has been completed, the sales agent must then assemble the information to be sent to the client, and transmit that information to the client. This could involve reviewing existing stores of information, or existing documentation to obtain the information to be sent to the client. In some instances, the sales agent may need to conduct research or perform a significant amount of work to format the information into documentation that can be easily sent to the client, and that can be easily understood and digested by the client. Ultimately, the sales agent could send the information to the client via email, via the postal system or a courier, or in some other fashion.

If the sales agent and the client agreed to another meeting or call, the sales agent may send an email or some other form of message to the client to remind them of the meeting or call. In some instances, the sales agent may send to the client an electronic meeting or call invitation that can be easily recorded in an electronic calendar maintained by the client.

Unfortunately, all of the above actions which must be performed by the sales agent after the call has been completed can be time consuming. It would be desirable to automate these actions, as much as possible, to reduce the amount of time that the sales agent must spend to fully service the client's needs.

BRIEF DESCRIPTION OF THE DRAWINGS

FIG. 9 is a diagram of a computer system and associated peripherals which could embody the invention, or which could be used to practice methods embodying the invention.

DETAILED DESCRIPTION OF PREFERRED EMBODIMENTS

Figure 1:
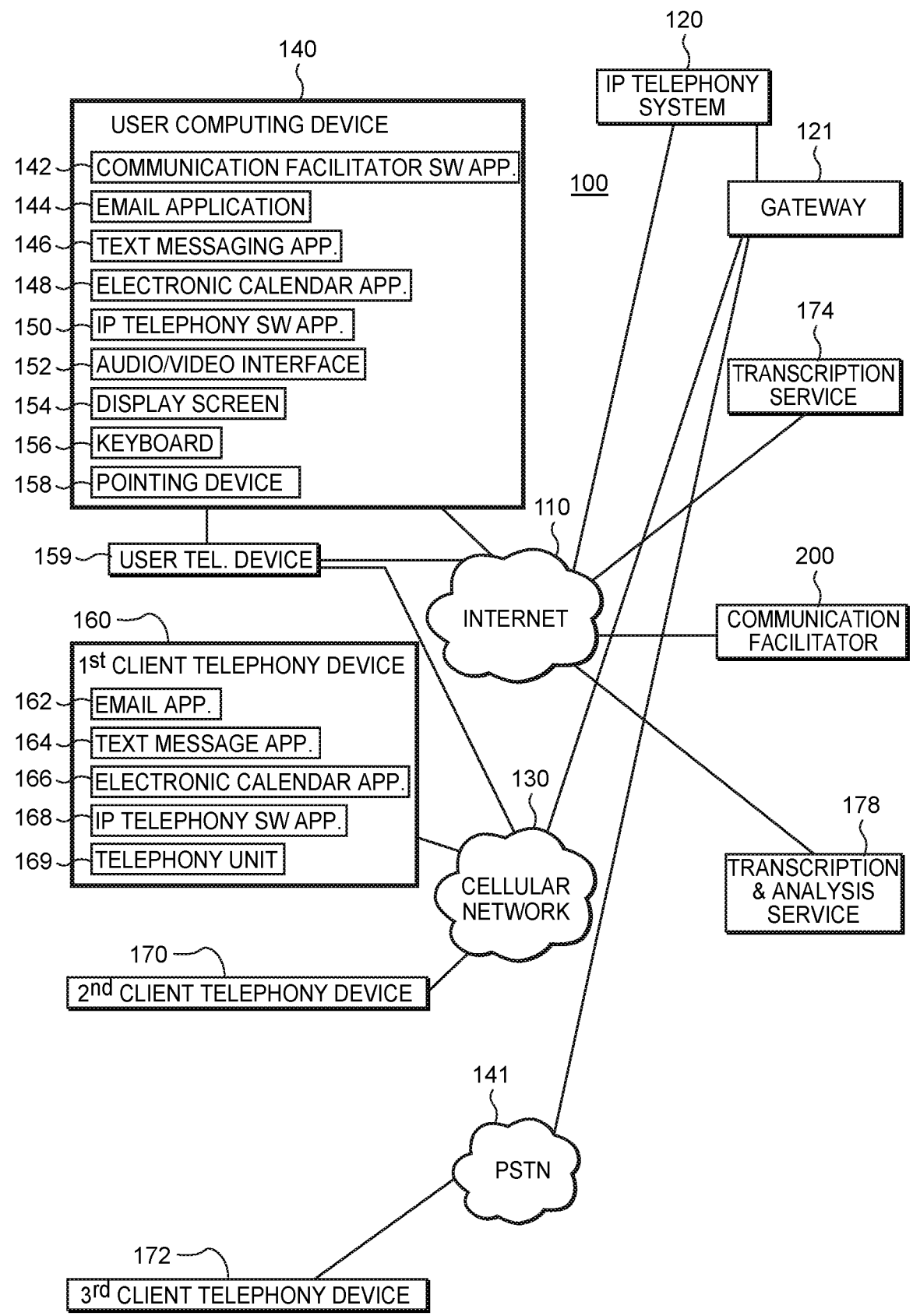
FIG. 1 is a diagram of a communications environment which could be utilized to perform methods embodying the invention.

The following detailed description of preferred embodiments refers to the accompanying drawings, which illustrate specific embodiments of the invention. Other embodiments having different structures and operations do not depart from the scope of the present invention.

The invention relates to systems and methods for facilitating communications and the exchange of information between two or more participants to a synchronous communication. The systems and methods disclosed and claimed herein can be used to automate many of the steps that a sales agent or a customer service agent must perform while satisfying a client's request for information, and in an effort to serve the client's needs.

The term "synchronous communication" used herein refers to a real-time or near-real-time communication which occurs between at least two participants. In some instances, more than two participants may interact with each other during a synchronous communication, such as in a conference call scenario.

A common example of a synchronous communication is a typical audio telephone call between first and second participants. However, other forms of near real-time or near-real-time communications between two or more participants could also comprise a synchronous communication. For example, a video call between two or more participants could comprise a synchronous communication. Indeed, a face-to-face conversation between two individuals comprises a synchronous communication, and if the conversation was recorded, the systems and methods disclosed herein could be applied to that face-to-face synchronous conversation. Another example would be where first and second participants are exchanging instant messages, text messages, or short video or audio messages with only small time delays between the exchange of each message. Such an exchange of messages also comprises a synchronous communication.

Another form of synchronous communication that is gaining popularity revolves around the use of "bots" or automated session initiators. Such bots will detect a visiting user's presence on a particular internet website page and, after a selected time interval, will launch itself to attempt to engage the visiting user in a chat session. If the visitor is interested in learning more about a particular product or service offered at the website, the bot will guide the visitor to additional information by asking questions or otherwise engaging in a natural language type interaction to collect responses. Such interaction may or may not end with redirection of the visitor to a live operator to request additional information beyond the scope of the bot or to complete a transaction.

In the following descriptions, and to aid in an explanation of systems and methods embodying the invention, the synchronous communication is a typical audio telephone call between first and second participants. While the use of a typical audio telephone call between two parties is helpful in illustrating the features of the invention, the invention is by no means limited to audio telephone calls between two parties. The claimed systems and methods are equally applicable to other forms of synchronous communications that involve two or more participants.

Before describing systems and methods embodying the invention, we will first discuss a communications environment 100, as illustrated in FIG. 1, in which the systems and methods could occur. In this communications environment 100, an IP telephony system 120 enables connection of telephone calls between its own customers and other parties via data communications that pass over a data network. The data network is commonly the Internet 110, however, private data networks may form all or a portion of the data communication path. The IP telephony system 120 is connected to the Internet 110. In addition, the IP telephony system 120 is connected to both a publicly switched telephone network (PSTN) 141 and a cellular telephony network 130. One or more gateways 121 could serve to connect the IP telephony system 120 to the PSTN 141 and to the cellular telephony network 130.

As mentioned above, the invention relates to systems and methods for facilitating communications and the exchange of information between two or more participants to a synchronous communication. One of the primary use case scenarios envisioned by the inventors is for the first participant to be a sales agent or a customer service agent, and for the second participant to be a client. Under those circumstances, the sales agent or customer service agent could be using the user computing device 140 illustrated in FIG. 1, which includes a communication facilitator software application 142. The client could be using the first client computing device 160, the second client telephony device 170 or the third client telephony device 172. For purposes of the following explanation, we will assume that a sales agent is using the user computing device 140.

As is well known to those of ordinary skill in the art, the synchronous communication established between the sales agent's computing device 140 and one of the client devices could be established in multiple different fashions. For purposes of providing an explanation of the invention, we will assume that the synchronous communication is an audio telephone call established between the sales agent's computing device 140, and a client utilizing one of the client devices 160, 170, 172. This audio telephone call could be setup as an IP-based telephone call that traverses the Internet 110 using an IP telephony system 120. In other embodiments, the audio telephone call could be connected to the second client telephony device 170 via the cellular network 130. In this instance, the second client telephony device could be a cellular telephone or a smart phone with cellular capabilities. In still other instances, the sales agent's computing device could be connected to the third client telephony device 172 via the PSTN 141.

The sales agent could communicate with a client device via an audio/video interface 152 of the computing device 140 in instances where IP telephony software 150 or the communication facilitator software 142 on the computing device 140 establishes an IP-based audio telephone call with the client device. In other instances, the sales agent could use a separate telephony device 159 that is connected to the sales agent's computing device 140 to establish an audio telephone call to the client device. Where the sales agent uses a separate telephony device 159, the audio telephone call could be setup as an IP-based call that traverses a data network such as the Internet 110, or as a cellular-based call that makes use of a cellular network. In some instances, the sales agent's telephony device 159 might also setup an audio telephone call to a client device via the PSTN 141.

As illustrated in FIG. 1, the user computing device 140 can include a communication facilitator software application 142 which will be described in detail below. The user computer device 140 may also include an email application 144, which the sales agent uses to send and receive email communications. In alternate embodiments, a web browser resident on the user computing device 140 could be used by the sales agent to send and receive email communications. In that instance, the web browser would be used to obtain access to a separate email service which is available via a data network, such as the Internet 110.

The user computing device 140 also includes a text messaging application 146. The text messaging application 146 could comprise an instant messaging application. The sales agent could utilize the text messaging or instant messaging application 146 to send information to a client, to receive information or inquiries from a client, and to conduct a synchronous communication with the client. In alternate embodiments, a web browser on the user computing device 140 could be utilized by the sales agent to obtain access to a text messaging or instant messaging application which is available through a data network, such as the Internet 110.

The user computer computing device 140 also includes an electronic calendar application 148. The electronic calendar application 148 is used by the sales agent to track in person meetings, scheduled calls with clients, conference calls which can be conducted between the sales agent and multiple other parties, and for various other purposes. In some embodiments, the electronic calendar application 148 will be resident on the user computing device 140. In alternate embodiments, the sales agent could utilize a web browser to access an electronic calendar application that is available via a data network, such as the Internet 110.

In some embodiments, the user computing device can also include an IP telephony software application 150 which the sales agent uses to conduct telephony communications with third parties, such as clients. The IP telephony software application 150 could enlist the services of a separate IP telephony system 120 to setup and conduct IP telephony communications with third parties. The IP telephony communications can include regular audio telephone calls, video calls, text messaging, instant messaging, and other forms of communications which pass over a data network.

In some embodiments, the user computing device 140 can include an audio/video interface 152. In some embodiments, this could include simply a speaker and a microphone connected to or integrated with the user computing device 140. In some instances, the audio/video interface 152 may also include a camera and a display screen to provide video capability. These elements can be integrated into the user computing device 140, or comprise peripherals which are coupled to the user computing device 140. The audio/video interface 152 allows the user to conduct audio and/or video communications with a client or other third party.

The user computing device 140 also includes a display screen 154, a keyboard 156, and a pointing device 158. These elements provide the basics of a user interface which allows the sales agent to use the user computing device 140 to conduct synchronous communications with clients, and to perform other functions.

In some instances a client could be using a client computing device 160 as illustrated in FIG. 1. The client computing device 160 also includes an email application 162. Although in some instances, the client could utilize a web browser to access a separate email service via a data network such as the Internet 110.

The client computing device 160 also includes a text messaging application 164. This text messaging application could be an instant messaging application. Also, the client could access a text messaging or instant messaging application via a data network such as the Internet 110.

The client computing device 160 further includes an electronic calendar application 166. As noted above, such an electronic calendar application can track meeting appointments, conference calls and other scheduled events. In some instances, the client could also utilize an electronic calendar application or service which is accessible via a data network, such as the Internet 110.

Finally, the client computing device 160 can include an IP telephony software application 168 which provides functionality to allow the client to engage in synchronous communications with other parties, such as a sales agent. The client computing device 160 could further include its own native telephony unit 169, such as a cellular telephony transceiver, which also allows the client to engage in synchronous communications with third parties, such as a sales agent. Where the telephony unit 169 is a cellular transceiver, the cellular transceiver could communicate through a cellular network 130.

The user computing device 140 and the client computing device 160 each could be embodied by a smart phone with appropriate software applications and a cellular transceiver. Alternatively, the user computing device 140 and the client computing device 160 could be embodied by laptop or desktop computers configured with appropriate software and peripherals. Also, although user computing device 140 and client computing device 160 could include all of the features described above, such devices also could have fewer than all of the elements discussed above, or additional elements.

The communications environment 100 illustrated in FIG. 1 further includes a transcription service 174. The transcription service 174 receives audio and/or video recordings of synchronous communications, and prepares transcriptions of the synchronous communications using those recordings. The transcription service 174 could use automated speech-to-text capabilities to create transcriptions from received audio and video recordings. In alternate embodiments, a human transcription assistant could be used to create transcriptions, or at least edit transcriptions that are prepared by an electronic speech-to-text system.

The communications environment 100 further includes an analysis service 178 that can perform analyses of transcriptions of audio or video recordings. The analysis service 178 may also be a transcription and analysis service 178 that is capable of receiving an audio or video recording, and both transcribing the audio or video recording, and performing analyses on the generated transcription. The analysis service 178 could be configured to extract various types of metadata from the transcription of an audio or video recording. In this instance, the term "metadata" is intended to broadly refer to multiple different types of information and summaries which are based on the transcription of an audio or video recording.

For example, the metadata for a synchronous communication could include a summary of the topics that were discussed during the synchronous communication. The metadata could include the identity of the parties which engaged in the synchronous communication, the time at which the synchronous communication occurred, and various other items of information which help to identify the parties or the circumstances under which the synchronous communication was conducted.

The metadata could also include a list of questions which were posed by one or both of the participants, a list of answers which were provided by one or both of the participants, as well as various other forms of summaries of the synchronous communication. The metadata could further include a listing of information that one or both of the participants promised to send to the other participant. The metadata can further include a subject matter of the synchronous communication, and/or a list of topics that were discussed during the call. The metadata can further include information about an agreed-upon time for a second communication or meeting which is to be conducted between the participants of the synchronous communication. The metadata could include action items identified by one or both of the participants. In short, metadata can include any information about the call, any information about issues that were raised during the call, and information about what the participants requested and what the participants promised. Although many examples of metadata are given above, these examples should in no way be considered limiting. The term "metadata" covers additional items beyond the specific examples given above.

As explained above, an analysis service 178 is configured to receive either a recording of an audio or video synchronous communication, or a transcript of the synchronous communication, and to then analyze that recording or transcription to derive, extract or generate any of the metadata items discussed above, as well as various other items or summaries of information relating to the synchronous communication.

The communications environment 100 also includes a communication facilitator 200, which will be discussed in greater detail below. In short, the communication facilitator 200 acts to automate functions or tasks that would otherwise be performed by one or more participants to a synchronous communication.

Figure 2:
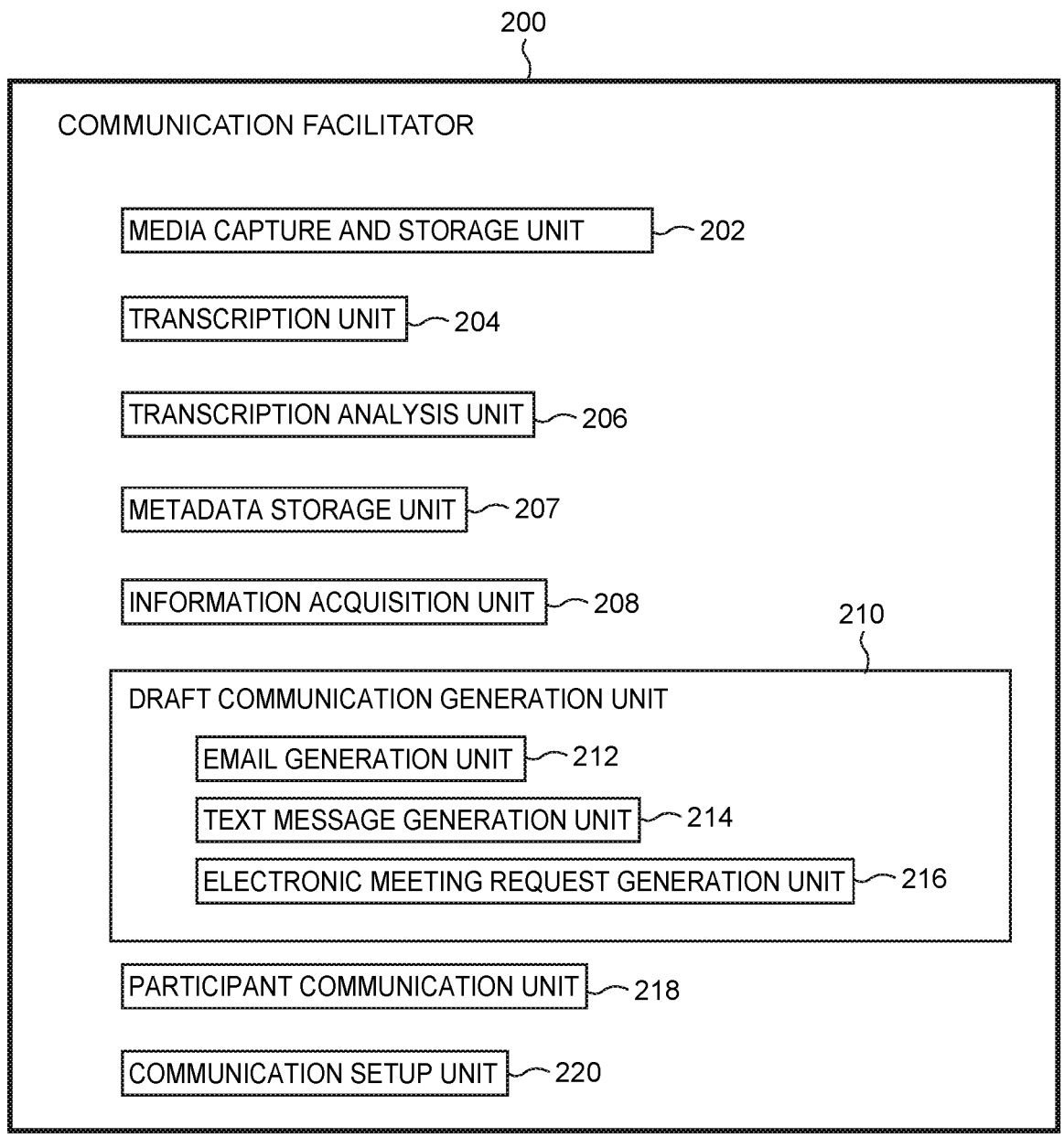
FIG. 2 is a diagram of elements of a communication facilitator embodying aspects of the invention.

FIG. 2 illustrates elements of a communication facilitator 200 embodying aspects of the invention. The communication facilitator 200 is configured to take certain actions that relieve participants to a synchronous communication of certain burdens associated with the synchronous communication. In the context of a telephone call between a sales agent and a client, the communication facilitator 200 could take various actions to aid the sales agent in responding to questions posed by a client, and in providing information to that client. The communications facilitator 200 may also aid in establishing future communications between the sales agent and the client.

The communication facilitator 200 includes a media capture and storage unit 202 that makes and/or obtains recordings of synchronous communications. As will be explained below, the communication facilitator 200 could include a communication setup unit 220 which is responsible for establishing a synchronous communication between two or more participants. In those instances, it would likely be easier for the media capture and storage unit 202 to obtain a recording of the synchronous communication. In other instances, the media of the synchronous communication could be transmitted to the media capture and storage unit 202, and the transmitted media of the synchronous communication can then be stored.

The communication facilitator 200 may also include a transcription unit 204 that creates written or text-based transcriptions of audio and/or video-based synchronous communications. The transcription unit 204 could include native speech recognition capabilities that enable the transcription unit 204 to convert the audio/video into text. In alternate embodiments, the transcription unit 204 could make use of speech recognition capabilities which are resident on some other platform or device, and which are available to the transcription unit 204 via a data network.

For example, a third party transcription service such as IBM's Watson service or the transcription service offered by a company called VoiceBase Inc. located at 535 Mission St., 14$^{th}$ Floor, San Francisco, Calif. could be used by the communication facilitator. An API offered by such transcription services can be used to send audio recordings to the transcription services and to receive back transcriptions of those audio recordings.

In some embodiments, the communication facilitator 200 will also include a transcription analysis unit 206 that analyzes a transcription of a synchronous communication to extract, generate or create metadata or other information relating to the synchronous communication. As explained above, the metadata can include a great variety of different types of information. The information can include a summary of the call, the names or identity of the participants, as well as communication identifiers for those participants. The metadata can include information about the subject matter of the call or topics that were discussed during the call. The metadata can include information in part provided by either of the participants, questions asked by the participants, information delivered by the participants, and promises made by participants for the future delivery of information. Moreover, the metadata could include a schedule for future communications, and action items identified by the participants. This list of metadata is by no means exhaustive, as various other items could also be obtained or generated by the transcription analysis unit 206.

The communication facilitator 200 may also make use of third party transcription analysis services such as IBM's Alchemy service. Here again, an API provided by such a third party transcription analysis service could be used to send transcriptions to the service for analysis, and to receive back the analysis once it is completed.

The metadata can be stored in a metadata storage unit 207. The metadata storage unit 207 could include one or multiple databases that store metadata that has been extracted from, generated for or created based on transcriptions of synchronous communications.

The communication facilitator 200 may also include an information acquisition unit 208 that obtains information from various sources to aid a participant in a synchronous communication. For example, if a client requested information from a sales agent during a synchronous communication, the information acquisition unit 208 could search out the information requested by the client. The information acquisition unit 208 could also search through existing stores of data which are maintained by at least one of the participants in an attempt to obtain information relevant to the synchronous communication. This can include searching for various documents which have been previously generated and stored by or for one of the participants.

The communication facilitator 200 further includes a draft communication generation unit 210 that prepares draft communications which can be sent from a first participant to one or more other participants of a synchronous communication. As such, the draft communication generation unit 210 would prepare a draft communication, then send the draft communication to the first participant. The first participant would then have the opportunity to edit or add to the draft communication before the first participant actually sends the communication to the second participant. In some instances, the draft communication could be addressed to both another participant, and to someone other than a participant of the synchronous communication. In still other instances, the draft communication could be addressed exclusively to one or more parties that were not a participant to the synchronous communication.

The draft communication generation unit 210 could include an email generation unit 212 that generates draft email communications and then forwards those draft email communications to one of the participants so that it can be sent from that participant to another participant. Likewise, the draft communication generation unit 210 could include a text message generation unit 214 that prepares draft text messages (or instant messages) that can be sent from one participant to another. The draft communication generation unit 210 may also include an electronic meeting request generation unit 216 that drafts an electronic meeting request and that forwards it to one of the participants. That participant can then send the meeting request to another participant to invite the other participant to join the first participant during a future meeting or scheduled call.

The communication facilitator 200 also includes a participant communication unit 218. The participant communication unit 218 can act as a user interface that allows a participant to configure the communication facilitator 200 in accordance with the participant's desires and wishes. The participant communication unit 218 can also communicate metadata and other information relating to a synchronous communication to one or more participants.

The communication facilitator 200 further includes a communication setup unit 220 which is configured to setup synchronous communications between two or more participants. As explained above, in some embodiments a participant could contact the communication facilitator 200 and request the setup of a synchronous communication with a second participant. In that instance, the communication setup unit 220 would be responsible for actually establishing the synchronous communication between the first and second participants. This can be done using the services of a separate communication system, such as the IP telephony system 120, cellular network 130 and PSTN 140 illustrated in FIG. 1.

Figure 3:
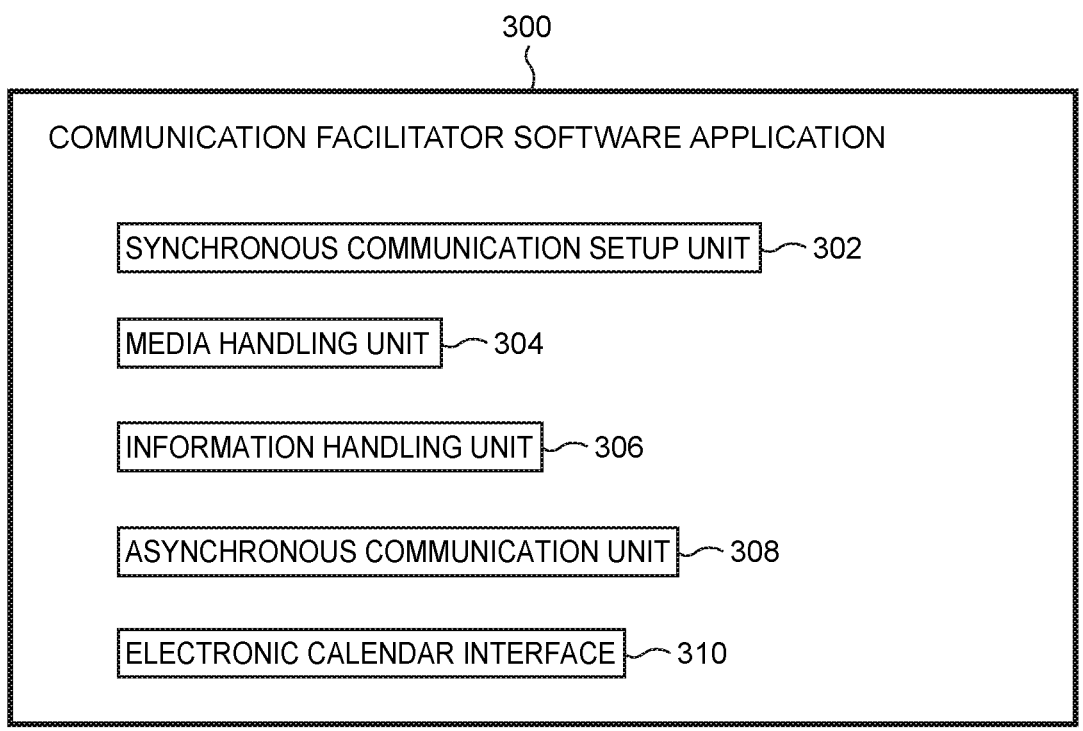
FIG. 3 is a diagram of elements of a communication facilitator software application which could embody aspects of the invention.

FIG. 3 illustrates elements of a communication facilitator software application 300 that could be resident on either a user computing device 140 or a user's telephony device, such as a smart phone. The communication facilitator software application 300 could facilitate communications between a participant and the communication facilitator 200 illustrated in FIG. 2.

The communication facilitator software application 300 could include a synchronous communication setup unit 302 which aids a participant in establishing a synchronous communication with another participant. As explained above, one participant could utilize a communication facilitator software application 300 on either a computing device or a telephony device to contact the communication facilitator 200 and request that the communication setup unit 220 of the communication facilitator 200 establish a synchronous communication between first and second participants. The synchronous communication setup unit 302 of the communication facilitator software application 300 would be responsible for communicating with the communication setup unit 220 of the communication facilitator 200 to cause those actions to occur. The synchronous communication setup unit 302 could act as a user interface to allow the first participant to identify a second participant, or multiple other participants, who are to communicate via the synchronous communication. For this reason, the synchronous communication setup unit 302 could include an interface to an existing contact list which has been established or is maintained for the participant. In instances where the communication facilitator software application 300 is resident on a user's computing device or telephony device, this could mean obtaining information from a contact list stored on that device, or which is available to the user via a data network.

The communication facilitator software application 300 further includes a media handling unit 304 which is responsible for handling the media of a synchronous communication. In some instances, the media handling unit 304 may forward the media of a synchronous audio or video communication to a separate communication facilitator 200. In some embodiments, the media handling unit 304 could create a recording of a synchronous communication as the synchronous communication is conducted. That recording could be forwarded to the communication facilitator 200 after the synchronous communication has been completed, or portions of the media of the synchronous communication could be continuously sent to the communication facilitator 200 while the synchronous communication is ongoing.

The communication facilitator software application 300 further includes an information handling unit 306. The information handling unit 306 can receive information sent to the communication facilitator software application 300 by the communication facilitator 200. For example, where a customer service agent communicates with a client during a synchronous communication, and where the communication facilitator 200 thereafter seeks out and obtains information that was requested by the client during the synchronous communication, the information handling unit 306 could thereafter obtain that information from the communication facilitator 200. The information handling unit 306 could store that information locally, or on a remote device. The information handling unit 306 could also present that information to a user in a variety of different formats, and make it easily available for transmission to a different participant.

The communication facilitator software application 300 further includes an asynchronous communication unit 308. In this instance, an asynchronous communication could be an email or text message, or an audio or video recording that is simply transmitted from a first participant to a second participant, or to a non-participant. As such, the asynchronous communication would not be part of a synchronous back and forth exchange between first and second participants, but instead would be a one-way communication from one participant to another party.

For example, the asynchronous communication unit 308 could be responsible for sending an email message from a first participant to a second participant. Likewise, the asynchronous communication unit 308 could send a text message to a participant. The asynchronous communication unit 308 may interact with other native software applications or utilities which are available on the same device that the communication facilitator software application 300 is installed upon. Thus, the asynchronous communication unit 308 could utilize the functions and facilities of other software applications or utilities which are designed to send asynchronous communications in order to send an asynchronous communication from a first participant to another party.

The communication facilitator software application 300 further includes an electronic calendar interface 310 which can interface with an electronic calendar that is maintained by or for a participant. Typically, the communication facilitator software application 300 would be installed on a user device such as a computing device or a telephony device. The electronic calendar interface 310 could interface with an electronic calendar stored on that user device, or which is available to the user via a data network.

Figure 4:
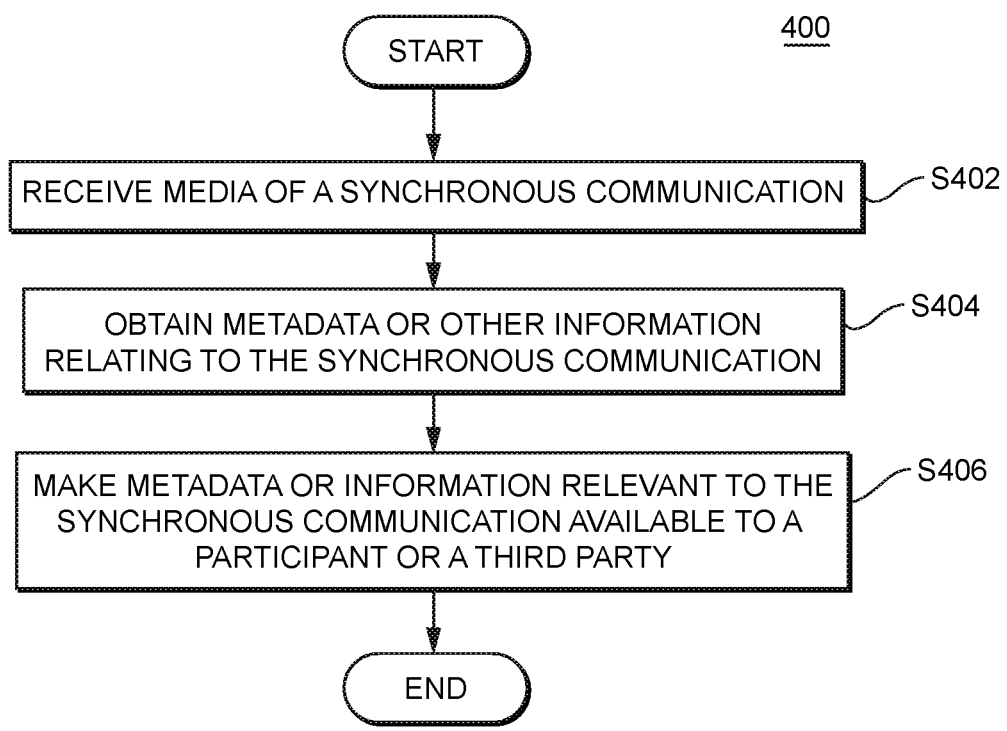
FIG. 4 is a flow chart showing steps of a method embodying the invention for facilitating communications between two participants of a synchronous communication.

FIG. 4 illustrates steps of a method embodying the invention for facilitating communications between two or more participants to a synchronous communication and/or between a participant and a non-participant. This method would be performed by a communication facilitator 200 as illustrated in FIG. 2.

The method 400 begins and proceeds to step S402 were a media capture and storage unit 202 receives media of a synchronous communication between first and second participants. The media of the synchronous communication could be received in a variety of different ways. In some instances, the communication facilitator 200, and specifically a communication setup unit 220, would have arranged the synchronous communication between the first and second participants. In that event, the communication facilitator 200 would likely be in a position to capture a copy of the media passing back and forth between the first and second participants. In other embodiments, a communication facilitator software application 300, as illustrated in FIG. 3, could be present on either a computing device or a telephony device used by one of the participants. In that event, a media handling unit 304 of the communication facilitator software application 300 could send the media of the synchronous communication to the media capture and storage unit 202 of the communication facilitator 200.

The method then proceeds to step S404 where one or more elements of a communication facilitator 200 obtain metadata or other information relating to the synchronous communication. The metadata or other information can be obtained in a variety of different ways, as will be explained below utilizing other drawing figures.

Figure 5:
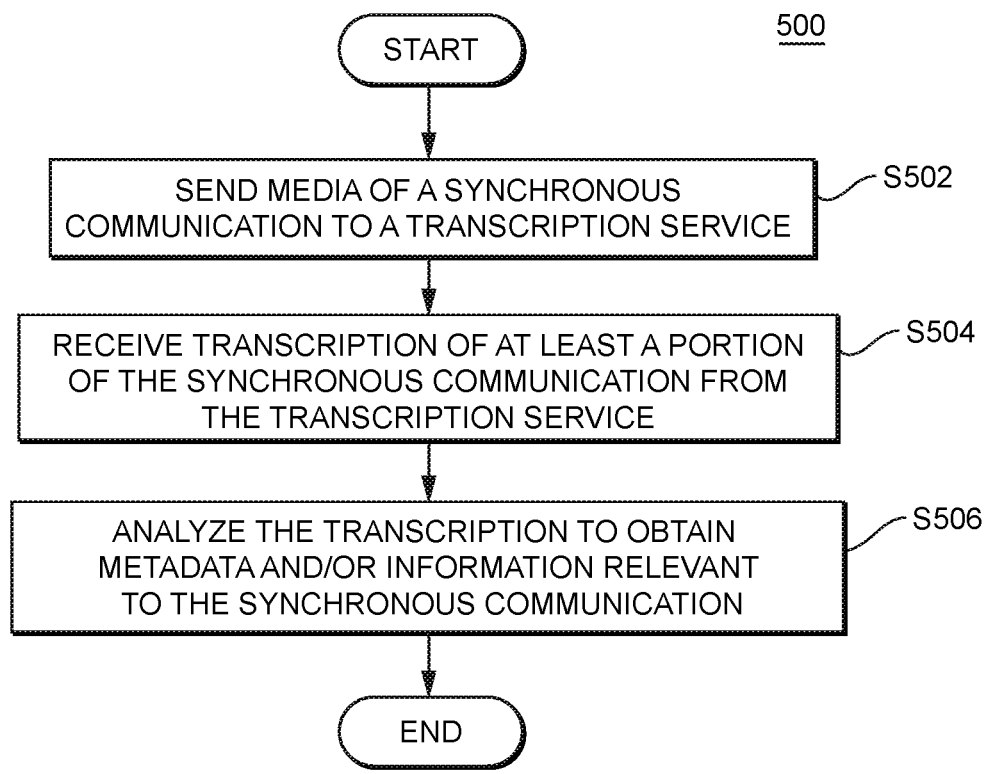
FIG. 5 is a flow chart showing steps of a method of obtaining metadata or other information relating to a synchronous communication.

In some instances, a method as illustrated in FIG. 5 could be used to obtain metadata or other information relevant to a synchronous communication. The method 500 begins and proceeds to step S502 where the media capture and storage unit 202 of a communication facilitator 200 sends media of the synchronous communication to an external transcription service 174, as illustrated in FIG. 1. The media capture and storage unit 202 would request that the transcription service 174 prepare a text-based transcription of the synchronous communication. The media capture and storage unit 202 could send portions of the media to the transcription service 174 while the synchronous communication is ongoing. Alternatively, the media capture and storage unit 202 could wait until it has received all of the media for the synchronous communication, and the media could then be forwarded to the transcription service 174 along with a request for a transcription.

The transcription service 174 would then prepare a transcription and send that transcription to a transcription analysis unit 206 of the communication facilitator 200. Step S504 of the method illustrated in FIG. 5 involves the transcription analysis unit 206 receiving the transcription of at least a portion of the synchronous communication from the transcription service 174.

The method then proceeds to step S506 where the transcription analysis unit 206 analyzes the transcription to extract or obtain metadata and/or information relevant to the synchronous communication from the transcription. All of the items of metadata discussed above could be extracted or generated based on such a transcription. The method illustrated in FIG. 5 would then end.

Figure 6:
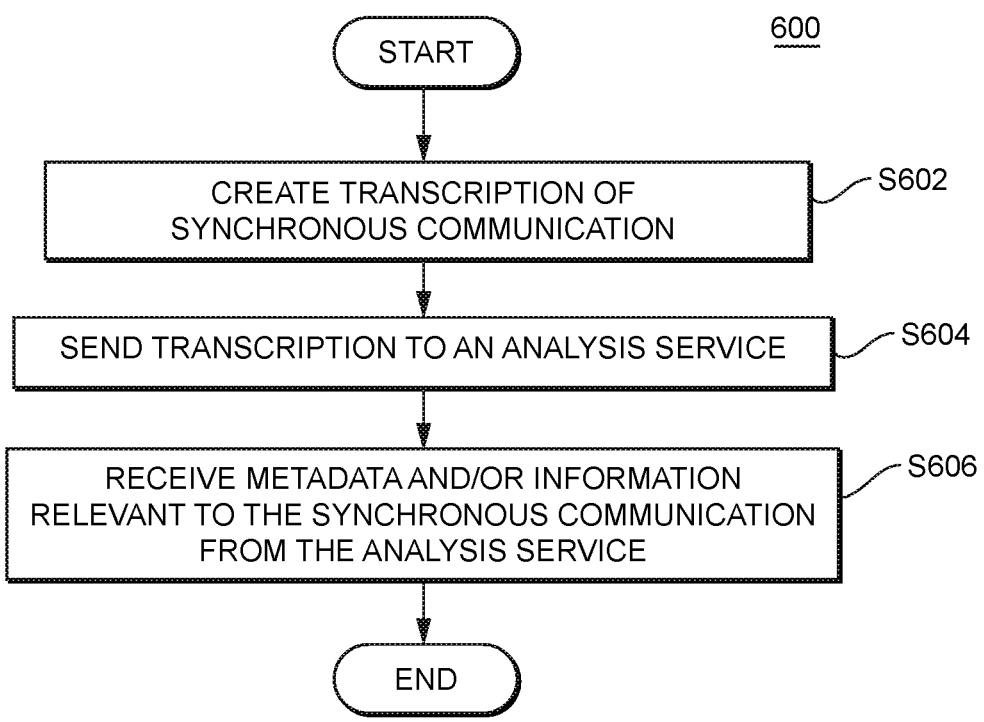
FIG. 6 is a flowchart illustrating steps of a second method of obtaining metadata or other information relating to a synchronous communication.

FIG. 6 illustrates steps of another method that could be used to obtain metadata or other information relevant to a synchronous communication. The method 600 begins and proceeds to step S602 where a transcription unit 204 of the communication facilitator prepares a transcription of a synchronous communication using media of the synchronous communication which has been captured and stored by the media capture and storage unit 202. The transcription unit 204 could use various speech recognition and speech-to-text facilities and functions to create the transcription. The transcription unit 204 could also utilize speech recognition and speech-to-text functions available through an external device.

The method then proceeds to step S604 where the transcription unit 204 sends the transcription to an external analysis service 178, as illustrated in FIG. 1. The analysis service 178 would review and analyze the transcription prepared by the transcription unit 204 to extract or generate metadata and/or other information relevant to the synchronous communication based the transcription.

The method then proceeds to step S606 were a metadata storage unit 207 of the communication facilitator 200 receives the metadata and/or other information relevant to the synchronous communication from the external analysis service 178. The method then ends.

Figure 7:
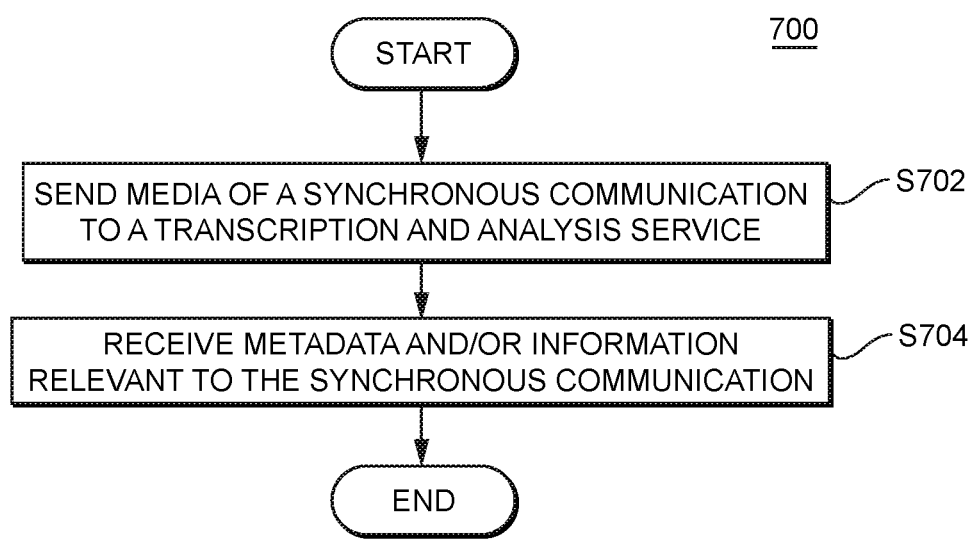
FIG. 7 is a flowchart illustrating steps of a third method of obtaining metadata or other information relating to a synchronous communication.

FIG. 7 illustrates yet another method which can be used to obtain metadata and other information relevant to a synchronous communication. The method 700 begins and proceeds to step S702 where the media capture and storage unit 202 of a communication facilitator 200 sends the media for a synchronous communication to an external transcription and analysis service 178, as illustrated in FIG. 1. The external transcription and analysis service 178 prepares a text-based transcription of the synchronous communication using that media. The external transcription and analysis service 178 then extracts or generates metadata and/or other information relevant to the synchronous communication based on that transcription.

The method then proceeds to step S704 where the metadata storage unit 207 of the communication facilitator 200 receives the metadata and/or other information relevant to the synchronous communication from the external transcription and analysis service 178. The method then ends.

Returning now to the method illustrated in FIG. 4, once metadata and/or information relevant to the synchronous communication has been obtained, generated or received in step S404, the method proceeds to step S406 where one or more elements of the communication facilitator 200 make the obtained metadata or information relevant to the synchronous communication available to one of the participants of the synchronous communication, and/or to a third party. This step can also be performed in a variety of different ways, as will be explained below.

As explained above, in some embodiments a draft communication generation unit 210 of the communication facilitator 200 can prepare a draft communication which is formatted to be sent from a first participant to a second participant of the synchronous communication and/or to a third party that was not a participant. The draft communication would then be sent to the first participant. The first participant can then either immediately forward the draft communication to a participant or third party, or the first participant could edit and modify the draft communication, and then forward it on to a participant or third party.

In some embodiments, the draft communication could be a draft email message created by an email generation unit 212. The email generation unit 212 would utilize the obtained metadata or other information relevant to the synchronous communication to determine what to include in the draft email message, and possibly to determine the identity of the party or parties to whom the draft email message should be addressed. For example, if the synchronous communication was a telephone call between a sales agent and a client, the metadata for the synchronous communication could include a summary of the issues or topics that were discussed, along with an identity of the client. The email generation unit 212 could utilize this to format a draft email from the sales agent to the client which include a summary of the topics that were discussed during the telephone call.

If the metadata or other information for the synchronous communication indicates that the sales agent promised to send various items of information to the client, then the email generation unit 212 could utilize the services of an information acquisition unit 208 to obtain the information promised by the sales agent. As explained above, the information acquisition unit 208 could utilize various stores of information to obtain the information that a sales agent promised to send to a client. The information acquisition unit 208 could then provide that information to the email generation unit 212, and the email generation unit 212 could include that information in the draft email that it prepares and forwards to the first participant, the sales agent.

In a similar fashion, if the client requested that certain information be provided to him while on the synchronous communication, that identity of the requested information could exist within the metadata. If the email generation unit 212 determines that the metadata indicates that the client asked for certain items of information, here again, the email generation unit 212 could utilize the services of the information acquisition unit 208 to obtain that information, and the information could be inserted into the draft email that is provided to the first participant, the sales agent.

In still other instances, if the first participant actually provided information to the second participant during the synchronous communication, such as providing quotes for various services or items, that information could also be present within the metadata. As a result, the email generation unit 212 could insert those same quotes into the draft email that is provided to the first participant, the sales agent.

The overall concept is that the email generation unit 212 uses the metadata or other information relevant to the synchronous communication that has been obtained in some fashion from an analysis of the synchronous communication to determine what to include in a draft email that is then provided to one of the participants. In some instances, the metadata itself (such as a summary of topics discussed) is inserted into the draft email. In other instances, the email generation unit 212 utilizes the metadata or other information to determine what information to obtain and insert into the draft email communication. The email generation unit 212 then obtains that information, possibly utilizing the services of the information acquisition unit 208.

The draft communication generation unit 210 could also include a text message generation unit 214. The text message generation unit 214 essentially would operate in a fashion similar to the email generation unit 212. However, the text message generation unit 214 would provide a draft text message or instant message to one of the participants so that it can be sent to the other participant.

The draft communication generation unit 210 could also include an electronic meeting request generation unit 216. The electronic meeting request generation unit 216 would utilize the obtained metadata or other information relevant to a synchronous communication to determine when the first and second participants agreed to a second meeting or telephone call. Using that information, the electronic meeting request generation unit 216 would format a meeting request and forward it to one of the two participants so that the participant could send it to the other participant. For example, if the metadata indicates that the first and second participants agreed to conduct a second telephone call one week later at a specific time, the electronic meeting request generation unit 216 would format a telephone call request and forward it to one of the two participants so that it could be sent to the other participant. Also, the electronic meeting request generation unit 216 could be configured to analyze the electronic calendars of all potential participants, and to then select a time convenient to all participants. The electronic meeting request could take a variety of different forms and be useful in connection with a variety of different electronic calendar systems, as is well known to those of ordinary skill in the art.

Returning now to the method illustrated in FIG. 4, step S406 involves making metadata or information relevant to a synchronous communication available to a participant. As explained above, a draft communication generation unit 210 could create a draft communication using or based on the metadata or other information relevant to a synchronous communication, and forward that draft communication to one of the two participants so that it can be sent to the other participant. However, this is only one way in which the communication facilitator 200 could make metadata or information relevant to a synchronous communication available to a participant. In other instances, a participant communication unit 218 could send various items of information to one of the participants. This information would not be formatted as a draft communication, but rather could take other forms.

For example, if the synchronous communication was a call between a sales agent and a client, and the client requested certain items of information, the participant communication unit 218 could utilize the metadata for the synchronous communication to determine what information the client requested. The participant communication unit 218 could then utilize the services of the information acquisition unit 208 to obtain that information. The participant communication unit 218 could then send that information to the sales agent, one of the participants.

As noted above, the information acquisition unit 208 could obtain information in a variety of different ways, and that information could be formatted in a variety of different formats. The participant communication unit 218 would then provide this information to one of the participants in a convenient form. For example, the information acquisition unit could obtain information in the form of a variety of documents or other pre-formatted data items which one of the participants has stored in a particular location. Thus, the information acquisition unit 208 could know to look to the participants' data repositories to obtain data which has been requested by of one of the participants.

The participant communication unit 218 could provide this information to one of the participants in a variety of different ways. In some instances, the data or documents could be sent to the participant electronically, perhaps as an attachment to an email. In other instances, the participant communication unit could send to one of the participants a URL or other link which will direct the participant to the location at which the requested data has been stored.

Although the above descriptions provide some examples of how information could be provided to a participant as part of step S406 of the method illustrated in FIG. 4, it will be evident to those of ordinary skill in the art that there are variety of alternate ways that the communication facilitator 200 could provide metadata or information relevant to a synchronous communication to one of the participants or to a third party. The ways in which data is obtained, and the ways in which that data is provided to a participant would be dependent on the context of the synchronous communication, and the information being sought. Thus, although the above descriptions provide some examples, those examples should in no way be considered limiting of how metadata or information relevant to a synchronous communication can be made available to a participant of a synchronous communication.

Figure 8:
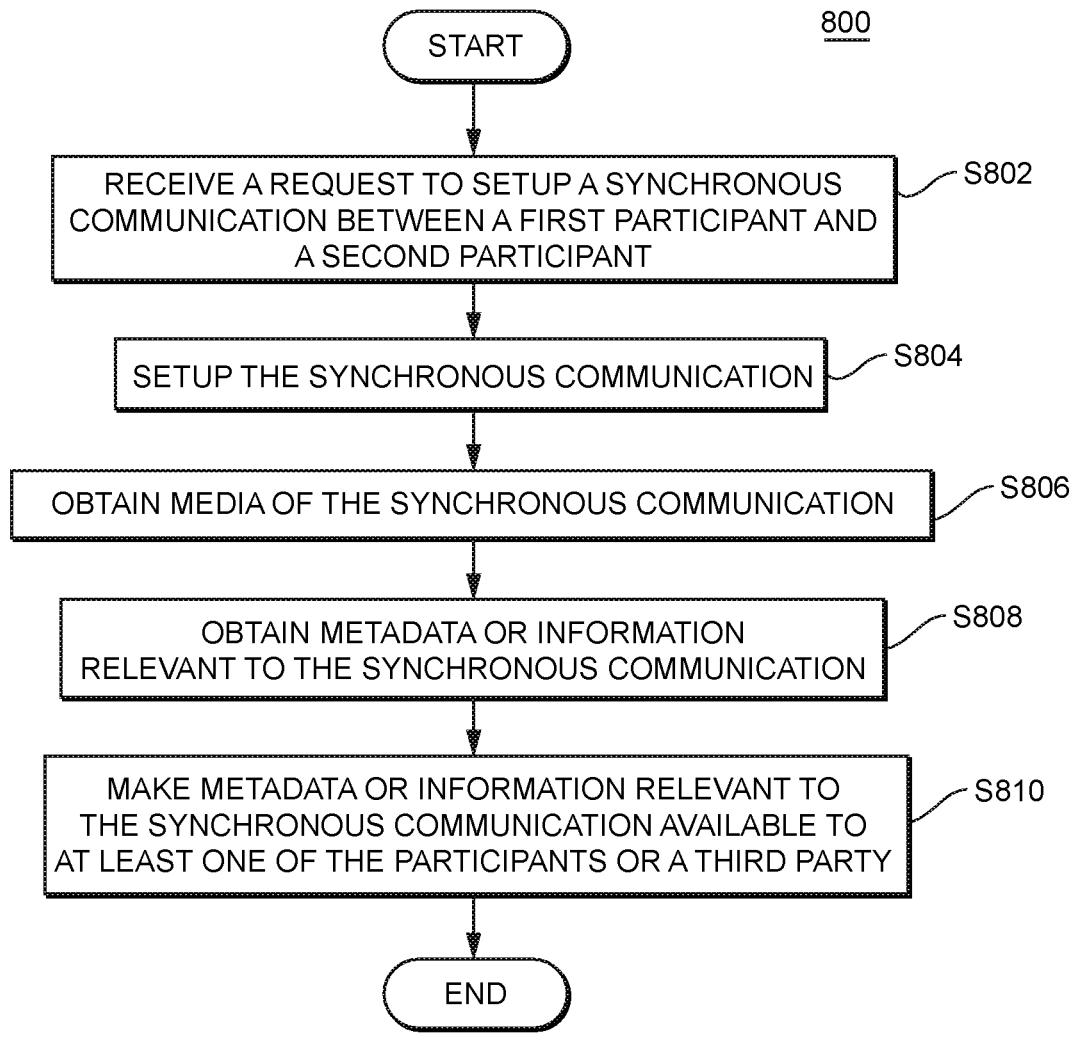
FIG. 8 is a flowchart illustrating steps of another method of facilitating communications between first and second participants to a synchronous communication.

FIG. 8 illustrates the steps of another method embodying the invention for making information or metadata available to a participant of a synchronous communication. The method 800 begins and proceeds to step S802 where a communication setup unit 220 of the communication facilitator 200 receives a request to setup a synchronous communication between a first participant and a second participant. The method proceeds to step S804 where the communication setup unit 220 then sets up the synchronous communication between the first and second participants. The communication setup unit 220 could setup an IP-based synchronous communication without the assistance of any other elements. In alternative embodiments, the communication setup unit 220 could utilize the services of an IP telephony system 120 to setup an IP based synchronous communication between the first and second participants. Alternatively, the communication setup unit 220 could also utilize the services of a PSTN 140 or cellular network 130 to reach one or both of the participants.

The method then proceeds to step S806 where a media capture and storage unit 202 obtains media of the synchronous communication. This can be done as discussed above in connection with step S402 of the method illustrated in FIG. 4. The method then proceeds to step S808 where elements of the communication facilitator 200 obtain metadata for the synchronous communication or information relevant to the synchronous communication. This can occur utilizing any of the methods described above.

The method then proceeds to step S810 where elements of the communication facilitator 200 make metadata or information relevant to the synchronous communication available to at least one of the participants and/or to a third party. Here again, this can be accomplished using any of the methods described above. The method then ends.

Many of the foregoing examples were provided in the context of a telephone call between a sales agent and a client. This is but one example of how systems and methods embodying the invention could be used. Systems and methods embodying the invention could be used in connection with a wide variety of other contexts. For example, systems and methods embodying the invention could be used to help a customer service agent communicate with a client that calls the customer service line of a business. Thus, references to specific embodiments in the foregoing examples should in no way be considered limiting of the invention.

In addition, many of the foregoing descriptions were for embodiments where two participants engage in a synchronous communication, and where one of the participants then receives information, a draft asynchronous communications, or a draft meeting invitation that can be sent to the other participant. In alternate embodiments, the synchronous communication could be one involving multiple participants. Also, the systems and methods embodying the invention could cause information, draft asynchronous communications and meeting invitations to be sent to multiple participants to the synchronous communication, as well as to third party non-participants.

The present invention may be embodied in methods, apparatus, electronic devices, and/or computer program products. Accordingly, the invention may be embodied in hardware and/or in software (including firmware, resident software, micro-code, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

FIG. 9 depicts a computer system 900 that can be utilized in various embodiments of the present invention to implement the invention according to one or more embodiments. The various embodiments as described herein may be executed on one or more computer systems, which may interact with various other devices. One such computer system is the computer system 900 illustrated in FIG. 9. The computer system 900 may be configured to implement the methods described above. The computer system 900 may be used to implement any other system, device, element, functionality or method of the above-described embodiments. In the illustrated embodiments, the computer system 900 may be configured to implement the disclosed methods as processor-executable executable program instructions 922 (e.g., program instructions executable by processor(s) 910) in various embodiments.

In the illustrated embodiment, computer system 900 includes one or more processors 910a-910n coupled to a system memory 920 via an input/output (I/O) interface 930. Computer system 900 further includes a network interface 940 coupled to I/O interface 930, and one or more input/output devices 950, such as cursor control device 960, keyboard 970, display(s) 980, microphone 982 and speakers 984. In various embodiments, any of the components may be utilized by the system to receive user input described above. In various embodiments, a user interface may be generated and displayed on display 980. In some cases, it is contemplated that embodiments may be implemented using a single instance of computer system 900, while in other embodiments multiple such systems, or multiple nodes making up computer system 900, may be configured to host different portions or instances of various embodiments. For example, in one embodiment some elements may be implemented via one or more nodes of computer system 900 that are distinct from those nodes implementing other elements. In another example, multiple nodes may implement computer system 900 in a distributed manner.

In different embodiments, the computer system 900 may be any of various types of devices, including, but not limited to, a personal computer system, desktop computer, laptop, notebook, or netbook computer, a portable computing device, a mainframe computer system, handheld computer, workstation, network computer, a smartphone, a camera, a set top box, a mobile device, a consumer device, video game console, handheld video game device, application server, storage device, a peripheral device such as a switch, modem, router, or in general any type of computing or electronic device.

In various embodiments, the computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs). In multiprocessor systems, each of processors 910 may commonly, but not necessarily, implement the same ISA.

System memory 920 may be configured to store program instructions 922 and/or data 932 accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 920. In other embodiments, program instructions and/or data may be received, sent or stored upon different types of computer-accessible media or on similar media separate from system memory 920 or computer system 900.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network (e.g., network 990), such as one or more external systems or between nodes of computer system 900. In various embodiments, network 990 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

In some embodiments, the illustrated computer system may implement any of the operations and methods described above, such as the methods illustrated by the flowcharts of FIGS. 3-8. In other embodiments, different elements and data may be included.

Those skilled in the art will appreciate that the computer system 900 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

In the foregoing descriptions, a communication facilitator 200 is shown to include a media capture and storage unit 202, a transcription unit 204, a transcription analysis unit 206, as well as various other elements. In practice, the various units that comprise the communication facilitator 200 may be independent systems which communicate with one another. In other words, the elements of the communication facilitator may not all be under the control of the same entity. For example, some elements of the communication facilitator such as the draft communication generation unit 210 may be operated by a first entity, while other elements such as the transcription unit 206 and the transcription analysis unit 206 may be operated by a second and/or third entities.

The individual elements that make up the communication facilitator 200 may communicate with one another through application programming interfaces (APIs). Thus, the media capture and storage unit 202 may utilize an API offered by an independent transcription unit 204 to send captured media to the transcription unit 204 and to receive back a transcription of that media provided by the transcription unit 204. Likewise, the draft communication generation unit 210 may use an API offered by the metadata storage unit 207 to obtain metadata for a synchronous communication from the metadata storage unit 207. Thus APIs could be used to communicate with one or more elements of the communication facilitator 200 that are operated by independent parties.

Moreover, APIs provided by elements of the communication facilitator could be used to configure how the elements perform. For example, an API offered by the media capture and storage unit 202 could be utilized to determine what synchronous communications are to be recorded and analyzed. An API offered by the transcription unit 204 could be utilized to determine how transcriptions are to be created and delivered. APIs offered by other elements of the communication facilitator 200 could likewise be utilized to configure how those other elements perform their assigned functions.

In many of the foregoing descriptions, a software application running on a telephony device may perform certain functions related to the disclosed technology. In alternate embodiments, a browser running on the telephony device may access a software application that is running on some other device via a data network connection. For example, the software application could be running on a remote server that is accessible via a data network connection. The software application running elsewhere, and accessible via a browser on the telephony device may provide all of the same functionality as an application running on the telephony device itself. Thus, any references in the foregoing description and the following claims to an application running on a telephony device are intended to also encompass embodiments and implementations where a browser running on a telephony device accesses a software application running elsewhere via a data network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer implemented method of automating post-communications activity resulting from a synchronous communication between first and second participants, comprising:
   receiving, with at least one processor, media of the synchronous communication between the first participant and the second participant;
   performing an operation upon the media to obtain metadata or other information relevant to the synchronous communication; and
   making at least one item of the metadata or other information relevant to the synchronous communication available to the first participant, wherein the making step comprises:
      preparing a draft asynchronous communication that includes an item of the metadata or other information relevant to the synchronous communication, wherein the draft asynchronous communication is a draft email message, a draft text message or a draft electronic meeting invitation; and
      providing, by the at least one processor and via a data network, the first participant with the draft asynchronous communication so that the asynchronous communication can be sent from the first participant to the second participant.

2. The method of claim 1, wherein performing an operation upon the media to obtain metadata or other information relevant to the synchronous communication comprises:
   obtaining, with at least one processor, a transcription of at least a portion of the synchronous communication; and
   analyzing the transcription to obtain the metadata or other information.

3. The method of claim 2, wherein the analyzing step comprises analyzing the transcription to identify a request made by the second participant during the synchronous communication, wherein the method further comprises obtaining information relevant to that request, and wherein the making step comprises making the obtained information available to the first participant.

4. The method of claim 1, wherein the making step further comprises sending location information to the first participant or a software application associated with the first participant, the location information identifying where the at least one item of metadata or other information is stored for retrieval.

5. The method of claim 1, where content of the draft asynchronous communication includes information requested by the second participant during the synchronous communication.

6. The method of claim 1, where content of the draft asynchronous communication includes information that the first participant provided to the second participant during the synchronous communication.

7. The method of claim 1, where content of the draft asynchronous communication includes information that the first participant indicated would be sent to the second participant during the synchronous communication.

8. The method of claim 1, wherein the making step comprises providing the first participant with a draft electronic meeting invitation for a future communication or meeting between the first participant and the second participant, and wherein at least one aspect of the draft electronic meeting invitation is based on the metadata or other information relevant to the synchronous communication.

9. The method of claim 1, wherein the making step further comprises providing the first participant with a summary of at least some aspects of the synchronous communication.

10. The method of claim 1, wherein the making step further comprises making at least one pre-existing document that is relevant to the synchronous communication available to the first participant.

11. The method of claim 10, wherein the metadata comprises topics or subjects that were discussed between the first and second participants during the synchronous communication, wherein the method further comprises identifying at least one pre-existing document that is relevant to the topics or subjects discussed between the first and second participants during the synchronous communication, and wherein the making step comprises making the at least one pre-existing document available to the first participant.

12. The method of claim 10, wherein the metadata comprises an information request made by the second participant during the synchronous communication, wherein the method further comprises identifying at least one pre-existing document that is relevant to the information request made by the second participant, and wherein the making step comprises making the at least one pre-existing document available to the first participant.

13. A system for automating post-communications activity resulting from a synchronous communication between first and second participants, comprising:
  means for receiving, with at least one processor, media of the synchronous communication between the first participant and the second participant;
  means for performing an operation upon the media to obtain metadata or other information relevant to the synchronous communication; and
  means for making at least one item of the metadata or other information relevant to the synchronous communication available to the first participant, wherein making at least one item of the metadata or other information relevant to the synchronous communication available to the first participant comprises:
    preparing a draft asynchronous communication that includes an item of the metadata or other information relevant to the synchronous communication, wherein the draft asynchronous communication is a draft email message, a draft text message or a draft electronic meeting invitation; and
    providing, by the at least one processor and via a data network, the first participant with the draft asynchronous communication so that the asynchronous communication can be sent from the first participant to the second participant.

14. A system for automating post-communications activity resulting from a synchronous communication between first and second participants, comprising:
  a media capture and storage unit comprising at least one processor that receives media of the synchronous communication between the first participant and the second participant;
  an analysis unit that performs an operation upon the media or a transcription of the media to obtain metadata or other information relevant to the synchronous communication; and
  a reporting unit that makes at least one item of the metadata or other information relevant to the synchronous communication available to the first participant, wherein the reporting unit:
    prepares a draft asynchronous communication that includes an item of the metadata or other information relevant to the synchronous communication, wherein the draft asynchronous communication is a draft email message, a draft text message or a draft electronic meeting invitation; and
    provides, by the at least one processor and via a data network, the first participant with the draft asynchronous communication so that the asynchronous communication can be sent from the first participant to the second participant.

15. The system of claim 14, where content of the draft asynchronous communication includes information requested by the second participant during the synchronous communication.

16. The system of claim 14, where content of the draft asynchronous communication includes information that the first participant provided to the second participant during the synchronous communication.

17. The system of claim 14, where content of the draft asynchronous communication includes information that the first participant indicated would be sent to the second participant during the synchronous communication.

18. The system of claim 14, wherein the reporting unit makes the at least one item of the metadata or other information relevant to the synchronous communication available to the first participant only after the synchronous communication has ended.

19. The method of claim 1, wherein the making step comprises making the at least one item of the metadata or other information relevant to the synchronous communication available to the first participant only after the synchronous communication has ended.

* * * * *